United States Patent [19]
Eaton et al.

[11] Patent Number: 5,960,673
[45] Date of Patent: Oct. 5, 1999

[54] ISOLATOR PAD FOR A STEERING COLUMN

[75] Inventors: Rodney L. Eaton, Clarkston; Thomas Grzybowski, Fraser; Thomas S. Kaliszewski, Troy; Ronald Klanke, Royal Oak, all of Mich.

[73] Assignee: Chrysler Corporation, Auburn Hills, Mich.

[21] Appl. No.: 09/054,174

[22] Filed: Apr. 2, 1998

[51] Int. Cl.[6] ................................. B62D 1/16
[52] U.S. Cl. .................. 74/492; 280/775; 280/777; 74/493
[58] Field of Search .............. 74/492; 280/777, 280/779

[56] References Cited

U.S. PATENT DOCUMENTS

| | | | |
|---|---|---|---|
| 2,549,925 | 4/1951 | Paton | 74/493 |
| 3,392,599 | 7/1968 | White | 280/777 |
| 3,415,140 | 12/1968 | Bien et al. | |
| 3,468,182 | 9/1969 | Shwartzberg | 74/492 |
| 3,832,911 | 9/1974 | Daniel et al. | 74/492 |
| 4,086,825 | 5/1978 | Badcock et al. | 74/492 |
| 4,517,854 | 5/1985 | Kawabata et al. | 74/492 |
| 5,700,032 | 12/1997 | Fukunaga | 280/775 |
| 5,704,254 | 1/1998 | Thomas et al. | 74/492 |
| 5,772,244 | 1/1998 | Park | 74/492 |

*Primary Examiner*—John A. Jeffery
*Assistant Examiner*—William C Joyce
*Attorney, Agent, or Firm*—Lawrence J. Shurupoff

[57] ABSTRACT

Apparatus for supporting a steering column of an automotive vehicle and for dampening vibration of the steering column when the vehicle is in motion. Support structure secured to the vehicle frame has a central support body and laterally spaced, first and second support flanges on opposite sides of the support body. A bracket secured to the steering column has a central bracket body and laterally spaced, first and second bracket flanges on opposite sides of the bracket body. The bracket body and its flanges are opposed to the support body and its flanges. Fastener assemblies connect the bracket flanges to the support flanges. An isolator pad is secured to the bracket in the space between the bracket body and the support body. The isolator pad is in sheet form and has portions forwardly and rearwardly of the fastener assemblies to dampen steering column vibration and rocking of the steering column about a transverse axis through the fastener assemblies.

9 Claims, 3 Drawing Sheets

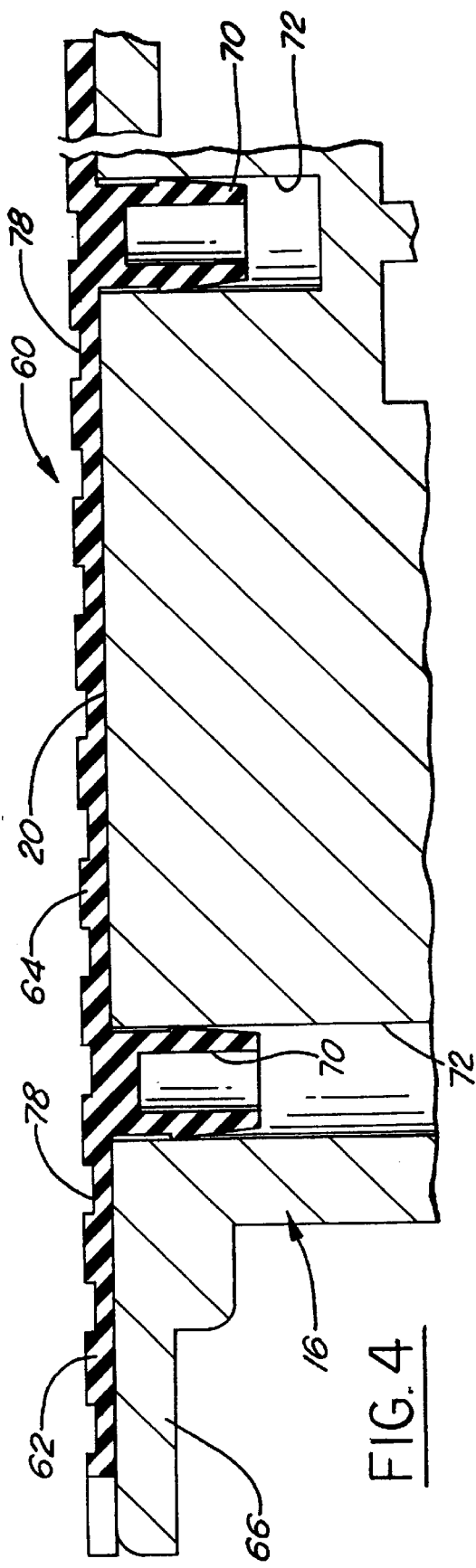
FIG. 4
FIG. 5
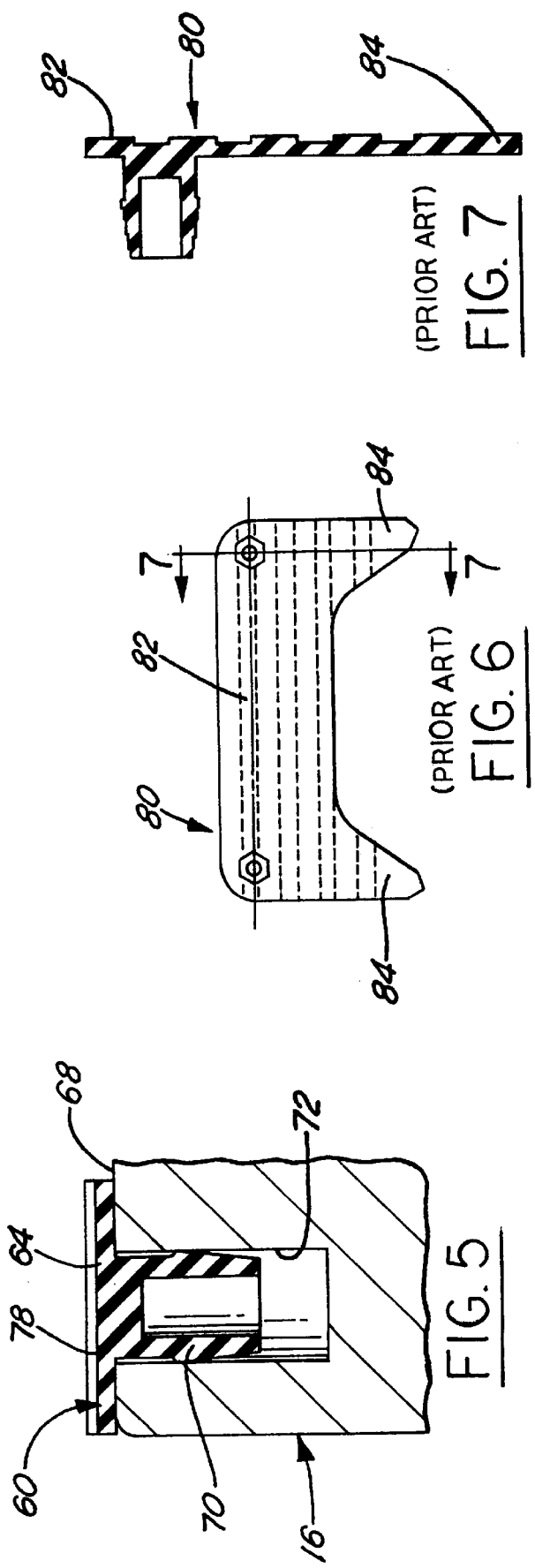
FIG. 6 (PRIOR ART)
FIG. 7 (PRIOR ART)

ISOLATOR PAD FOR A STEERING COLUMN

This invention relates to a steering column support system in which an isolator pad is provided for dampening vibration and preventing undesirable rocking of the steering column when the automobile is in motion.

BACKGROUND AND SUMMARY OF THE INVENTION

A steering column is typically secured to rigid frame structure of the vehicle. There is a tendency for the steering column to vibrate and also to tilt or rock when the vehicle is in motion. Spacers have been employed to dampen and reduce this tendency of the steering column to vibrate. Spacers heretofore employed have been reasonably successful but are not a complete solution to the problem.

In accordance with the present invention, an isolator pad is provided in the space between the support structure of the vehicle and a bracket to which the steering column is secured. The isolator pad is preferably made of a non-metallic material such as, for example, as rubber, polyurethane or Nylon, or some other suitable resinous plastic material.

Preferably, the support structure has a central body and laterally spaced support flanges on opposite sides of the body. The bracket to which the steering column is secured also has a central body and laterally spaced bracket flanges. The flanges of the bracket and of the support structure are secured together by fasteners, and the isolator pad is placed between the bracket body and the support body.

The isolator pad in the preferred embodiment is in sheet form and is generally U-shaped in cross-section having a transverse strip between the front portions of the bodies of the bracket and support structure, and elongated side strips between the side portions of the bodies. The transverse strip is located forwardly of the fasteners and the side strips extend rearwardly beyond the fasteners to not only dampen the steering column against vibration but also to prevent it from rocking in both directions. The isolator pad keeps the bracket and the support structure out of contact with one another. Spacers of a material similar to that of the pad are preferably provided between the flanges.

The isolator pad, assisted by the spacers, provide a quiet, substantially vibration free mounting for the steering column with little or no tendency to rock up and down.

One object of the invention is to provide a steering column support which includes an isolator pad for reducing, if not totally eliminating, vibration and rocking motion in both directions, and having the foregoing features and capabilities.

Another object is to provide in the support structure for a steering column, an isolator pad which is of simple construction, designed for long term use, and is easy and inexpensive to manufacture and install.

These and other objects, features and advantages of the invention will become more apparent as the following description proceeds, especially when considered with the accompanying drawings.

BRIEF DESCRIPTION OF THE DRAWINGS

FIG. 3A is a fragmentary sectional view taken on the line 3A—3A in FIG. 3.

FIG. 4 is a sectional view taken on the line 4—4 in FIG. 3.

FIG. 5 is a sectional view taken on the line 5—5 in FIG. 3.

FIG. 6 is a plan view of a prior art isolator pad.

FIG. 7 is a sectional view taken on the line 7—7 in FIG. 6.

DETAILED DESCRIPTION OF THE PREFERRED EMBODIMENT

Figure 1:
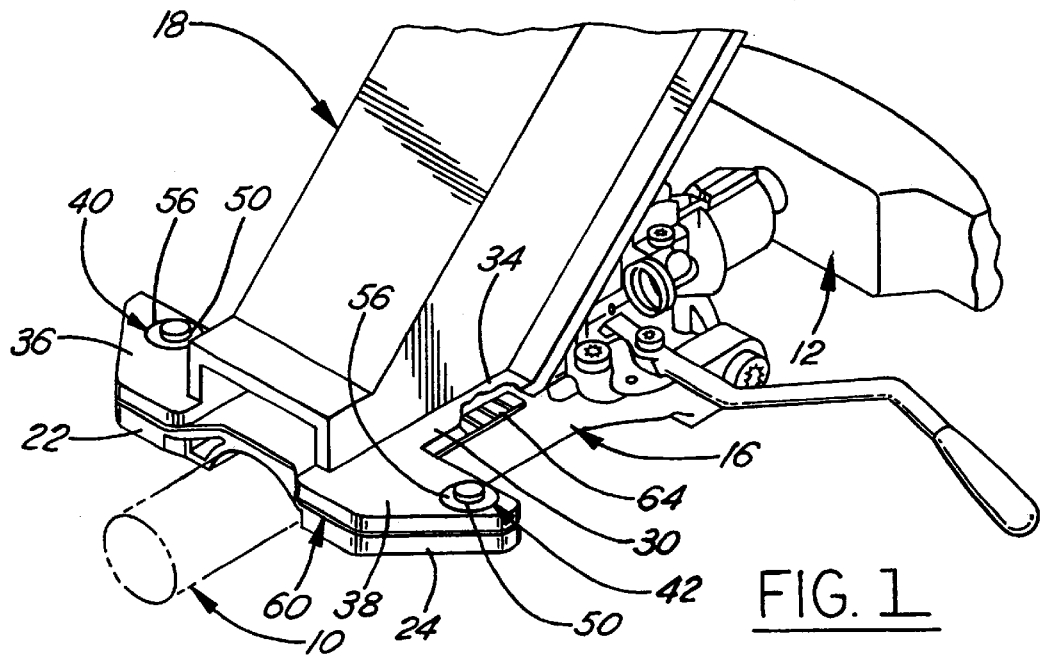
FIG. 1 is a perspective view showing a steering column bracket secured to support structure of an automotive vehicle, with an isolator pad constructed in accordance with the invention between the bracket and the support structure.
Figure 2:
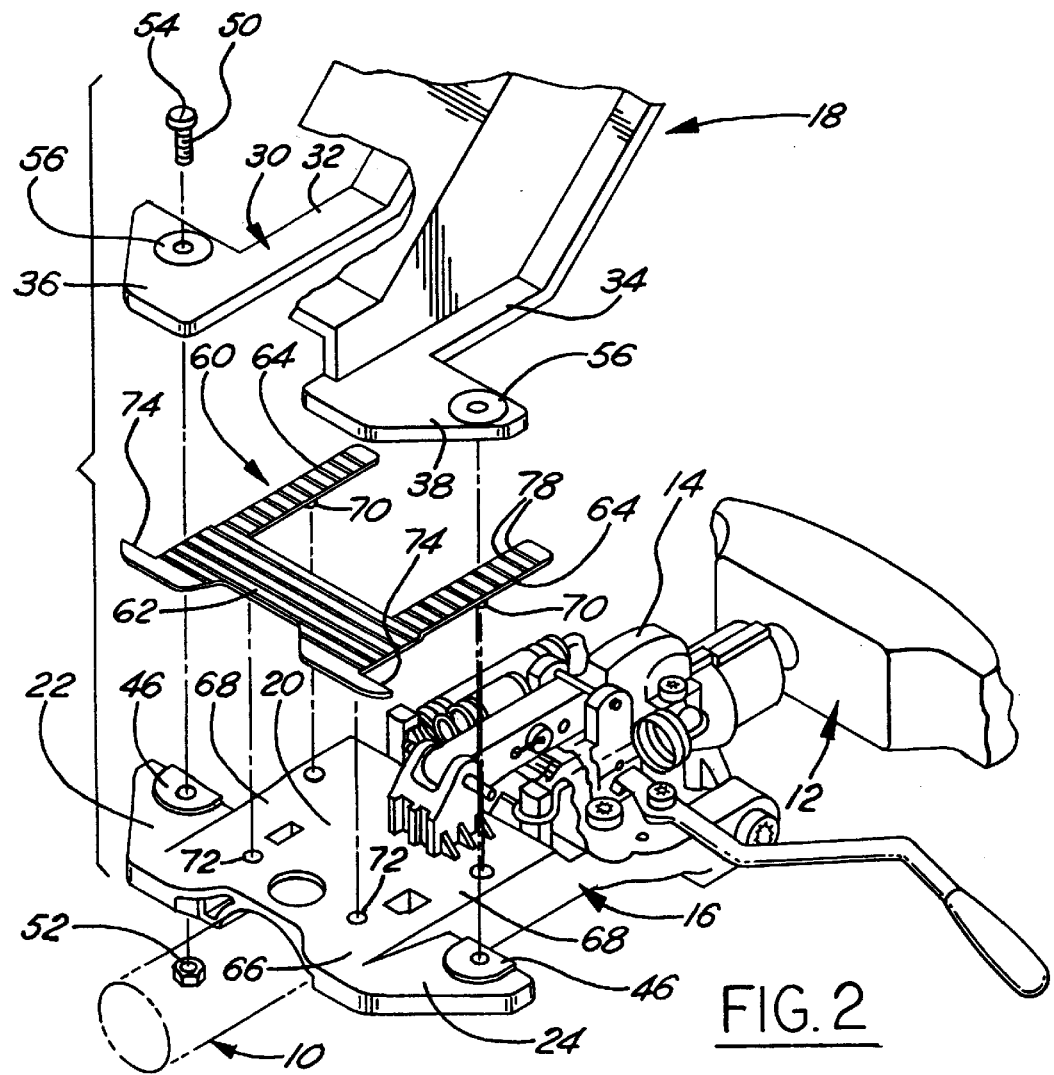
FIG. 2 is an exploded perspective view of the structure shown in FIG. 1.

Referring now more particularly to the drawings, there is shown in broken lines in FIG. 1 an elongated steering column 10 extending generally from front to rear of an automotive vehicle. A tilt steering wheel 12 is pivoted to the rear end of the steering column 10 and is adapted to be releaseably locked in an adjusted position by a latch mechanism 14 (FIG. 2) which forms no part of this invention.

The steering column 10 is secured to a mounting bracket 16 which in turn is secured to a rigid vehicle support structure 18.

Figure 3:
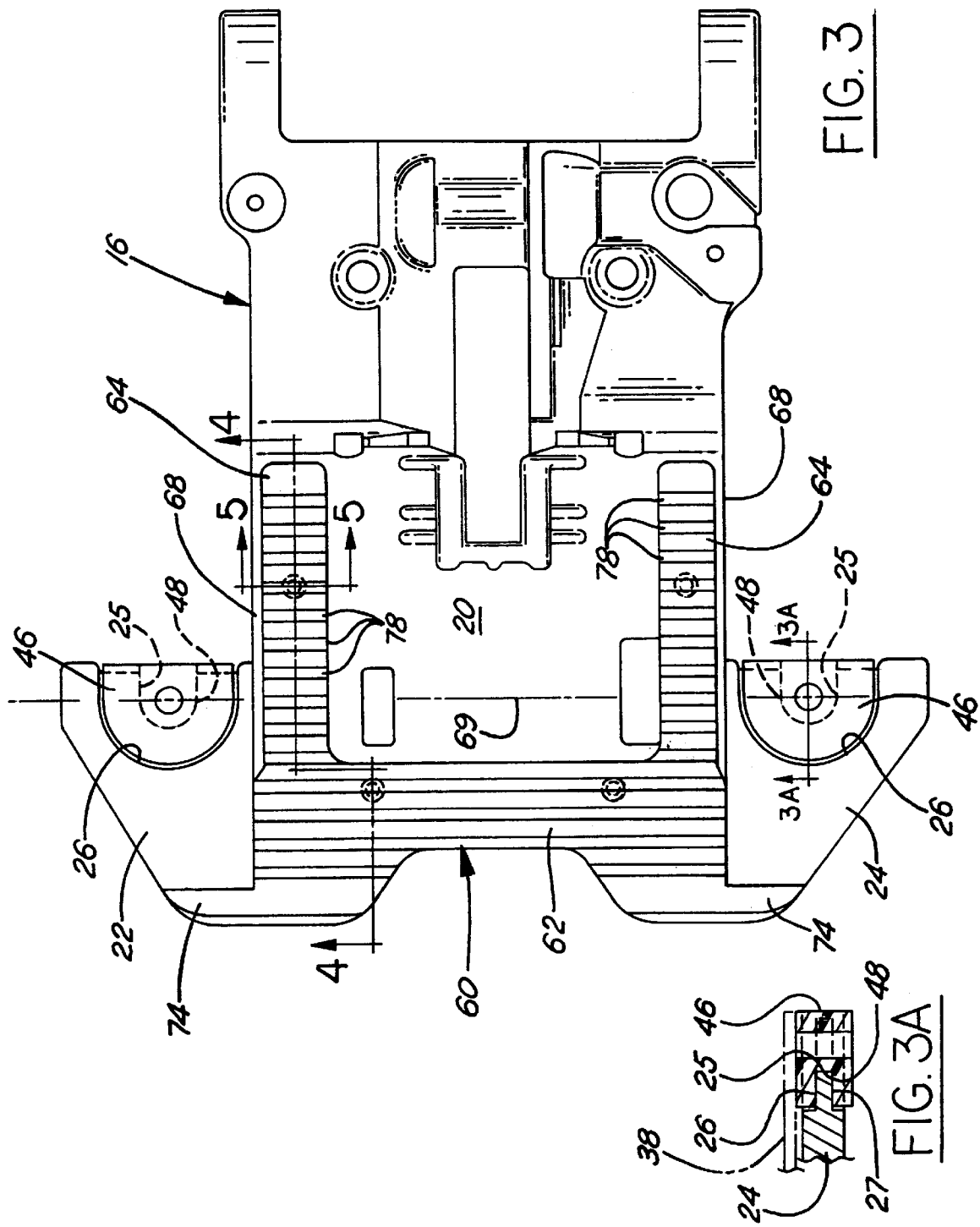
FIG. 3 is a plan view showing the isolator pad attached to the bracket, with the spacers in place on the bracket flanges but with the washers, nuts and bolts removed.

The bracket 16 has a central body 20 with integral flanges 22 and 24 extending laterally outwardly from the opposite side edges of the body 20 at the front of the bracket. Each bracket flange 22, 24 has a notch 25 (FIGS. 3, 3A) which is open through the rear edge thereof. There are upper and lower recesses 26 and 27 in each flange 22, 24 surrounding the notch therein.

At its bottom, the support structure 18 has a central body 30 consisting of a pair of laterally spaced apart, coplanar side bars 32 and 34 which extend generally lengthwise of the steering column. The support structure also has integral flanges 36 and 38 which extend laterally outwardly from the outer side edges of the side bars 32 and 34 at the front of the body 30.

The bracket 16 is secured to the support structure 18 by fastener assemblies 40 and 42 (FIG. 1), with the bracket body 20 opposed to the support body 30 and with the bracket flanges 22 and 24 opposed to the respective flanges 36 and 38 of the support structure. Each fastener assembly 40,42 includes a disk-like spacer 46 with a continuous groove 48 (FIG. 3A) extending around the front and side edges thereof which receive the edges of the associated notch 25. The front and side edges of the spacers fit in the recesses 26 and 27. The spacers are thick enough to extend above the top surface of the bracket flanges 22 and 24 to space the flanges 22 and 24 from the support structure flanges 36 and 38 and thus keep the flanges out of surface contact with one another. Each fastener assembly 40, 42 also includes a bolt 50 and a nut 52 threaded on the bolt. The bolt 50 has a head 54 on one end and extends through the spacer 46 and through the opposed flanges 22, 36 and 24, 38 of the support structure 18 and the bracket 16, with the nut 52 threaded on the opposite end and tightened to clamp the flanges together securely. Washers 56 may, if desired, be provided under the head 54 of the bolt and under the nut 52.

The spacers 46 are preferably formed of rubber or a suitable resinous plastic material such as polyurethane or Nylon, and are effective in reducing the transfer of vehicle vibration to the steering column. The fastener assemblies 40, 42 have a sliding engagement in the notches 25 of the bracket flanges to allow the steering column to collapse in the event of a head-on collision without any significant drag from the fastener assemblies, which remain fixed relative to the vehicle support structure.

An isolator pad 60 is placed between the body 20 of the bracket and the body 30 of the support structure. The isolator pad 60 is in the form of a generally U-shaped sheet having an elongated transverse strip 62 and laterally spaced apart elongated side strips 64 extending from opposite ends of the transverse strip 62.

The isolator pad 60 rests on the body 20 of the bracket 16 with its transverse strip 62 on a transverse front portion 66 of the top surface of the body, and with the side strips 64 resting on laterally spaced, longitudinally extending side portions 68 of the top surface of the body. The top surfaces of the front and side body portions 66 and 68 are flat and coplanar. The front portion 66 of the body 20 of bracket 16 is disposed forwardly of a straight line 69 (FIG. 3) connecting the fastener assemblies 40, 42. The side portions 68 of the body extend rearwardly from the opposite ends of the transverse body portion 66 substantially beyond the line 69 connecting the fastener assemblies. The side strips 64 of the isolator pad 60 also extend rearwardly beyond that line.

The body 30 of the support structure 18 extends over the isolator pad 60. The front end portions of the side bars 32 and 34 are forwardly of the line 69 connecting the fastener assemblies and press down upon the transverse strip 62 of the isolator pad 60. The side bars 32 and 34 of the support structure 18 extend rearwardly beyond the line 69 connecting the fastener assemblies a substantial distance and press down upon the side strips 64 of the isolator pad. Preferably, the isolator pad has downwardly extending integral plugs 70 (FIGS. 4 and 5) engaging in holes 72 formed in the body 20 of the bracket 16 to releaseably hold the isolator pad in position during assembly of the parts.

The isolator pad 60 may be made of the same material as the spacers 46 and have a durometer of about 44 to 52 with a durometer of 48 being preferred.

Projecting laterally outwardly from the opposite ends of the transverse strip 62 of the isolator pad 60 are integral tabs 74 which extend between the front portions of the flanges 22, 36 and 24, 38. The isolator pad 60 including the tabs 74, together with the spacers 46, keep the entire bracket 16 out of metal-to-metal contact with the support structure 18.

The isolator pad has a series of surface depressions in its top surface, preferably in the form of longitudinally spaced transverse grooves 78 (FIG. 4). The depressions or grooves increase the compressibility of the isolator pad.

FIGS. 7 and 8 show a prior art isolator pad 80 which differs significantly from the isolator pad 60 of this invention.

The pad 80 has a transverse strip 82 which is generally similar to the transverse strip 62 of the pad 60 of the present invention. The prior art pad 80 would be placed between the front portion 66 of the body 20 of bracket 16 and the front portions of the side bars 32 and 34 of the body 30 of the support structure 18. However, the prior art pad 80 has nothing similar to the side strips 64 of the pad 60 of this invention. The transverse strip 82 of the prior art pad 80 would be helpful in resisting rocking of the bracket 16 in one direction, but the pad 80 would not resist rocking in the opposite direction because the stubby rearward extensions 84 at the ends of the transverse strip 82 do not extend far enough rearward to cross the line 69 connecting the fastener assemblies 40, 42.

What is claimed is:

1. Apparatus for supporting a steering column of an automotive vehicle having a vehicle frame, said apparatus dampening vibration of the steering column when the vehicle is in motion, comprising:

support structure secured to the vehicle frame and having a central support body and laterally spaced, first and second support flanges on opposite sides of said support body, a bracket secured to the steering column and having a central bracket body and laterally spaced, first and second bracket flanges on opposite sides of said bracket body, said bracket body being opposed to said support body and said bracket flanges being opposed to said respective support flanges, means securing said bracket to said support structure comprising fastener assemblies connecting said first bracket flange to said first support flange and said second bracket flange to said second support flange, and an isolator pad between and in surface-to-surface contact with said bracket body and said support body, said isolator pad having a portion forwardly of said fastener assemblies and a portion rearwardly of said fastener assemblies to dampen steering column vibration and rocking of said steering column about a transverse axis through said fastener assemblies.

2. Apparatus as in claim 1, wherein said isolator pad is secured to one of said bodies.

3. Apparatus as in claim 2, wherein said bodies have opposed transversely extending front portions located forwardly of said flanges and opposed, laterally spaced, longitudinally extending side portions which extend from opposite ends of said front portion rearwardly beyond said flanges, said isolator pad is in sheet form and the portion thereof forwardly of said fastener assemblies comprises an elongated transverse strip between and in surface-to-surface contact with said front portions of said bodies, and said isolator pad has laterally spaced, elongated side strips extending from opposite ends of the said transverse strip rearwardly beyond said fastener assemblies between and in surface-to-surface contact with said respective side portions of said bodies to provide the portion of said isolator pad rearwardly of said fastener assemblies.

4. Apparatus as in claim 3, wherein said isolator pad is secured to said bracket body.

5. Apparatus as defined in claim 1, wherein said isolator pad is made of a resinous, plastic material.

6. Apparatus for supporting an elongated steering column of an automotive vehicle having a vehicle frame, said apparatus dampening vibration of the steering column when the vehicle is in motion and also permitting axial collapse of the steering column in a collision, comprising, support structure secured to the vehicle frame and having a central support body and laterally spaced, first and second support flanges on opposite sides of said support body, a bracket secured to the steering column and having a central bracket body and laterally spaced, first and second bracket flanges on opposite sides of said bracket body, said first bracket flange having a rear edge provided with a first recess and said second bracket flange having a rear edge provided with a second recess, said bracket body being opposed to said support body and said bracket flanges being opposed to said respective support flanges, means securing said bracket to said support structure comprising fastener assemblies connecting said first bracket flange to said first support flange and said second bracket flange to said second support flange, said fastener assemblies including spacers between said bracket flanges and said support flanges, said fastener assemblies being rearwardly slidable out of said recesses, thereby enabling forward movement of said bracket flanges relative to said support flanges and longitudinal collapse of the steering column in the event that the vehicle is subjected to a frontal impact, an isolator pad between said bracket body and said support body, said isolator pad being secured to said bracket body, said bodies having opposed, transversely extending front portions located forwardly of said fastener assemblies and opposed, laterally spaced, longitudinally extending side portions which extend from opposite ends of said front portion rearwardly beyond said fastener assemblies, said isolator pad being in sheet form and generally U-shaped having an elongated transverse strip between and in surface-to-surface contact with the front portions of said bodies and laterally spaced, elongated side strips between and in surface-to-surface contact with the side portions of said bodies extending from opposite ends of said transverse strip rearwardly beyond said fastener assemblies to dampen steering column vibration and rocking of said steering column about a transverse axis through said fastener assemblies.

7. Apparatus as in claim 6, wherein said spacers and said isolator pad are made of resinous plastic material.

8. Apparatus as in claim 7, wherein said isolator pad is compressible, and said transverse strip and said side strips of said isolator pad have surface depressions to increase the compressibility thereof.

9. Apparatus as in claim 8, wherein said depressions are longitudinally spaced, transverse grooves.

\* \* \* \* \*